(12) United States Patent
Cloutier Boily

(10) Patent No.: US 10,292,324 B2
(45) Date of Patent: May 21, 2019

(54) METER ROLLER FOR AN AGRICULTURAL METERING SYSTEM

(71) Applicant: CNH Industrial Canada, Ltd., Saskatoon (CA)

(72) Inventor: Guillaume Cloutier Boily, Martensville (CA)

(73) Assignee: CNH Industrial Canada, Ltd., Saskatoon, Saskatchewan (CA)

( * ) Notice: Subject to any disclaimer, the term of this patent is extended or adjusted under 35 U.S.C. 154(b) by 9 days.

(21) Appl. No.: 15/456,290

(22) Filed: Mar. 10, 2017

(65) Prior Publication Data

US 2018/0255700 A1 Sep. 13, 2018

(51) Int. Cl.
| | | |
|---|---|---|
| *A01C 7/12* | (2006.01) | |
| *A01C 7/04* | (2006.01) | |
| *A01C 7/06* | (2006.01) | |
| *A01C 7/08* | (2006.01) | |
| *A01C 19/02* | (2006.01) | |

(52) U.S. Cl.
CPC .............. *A01C 7/127* (2013.01); *A01C 7/042* (2013.01); *A01C 7/06* (2013.01); *A01C 7/082* (2013.01); *A01C 19/02* (2013.01)

(58) Field of Classification Search
CPC .. A01C 7/12; A01C 7/14; A01C 7/121; A01C 7/122; A01C 7/127; A01C 7/08; A01C 7/00; A01C 7/042; A01C 7/04; A01C 7/06; A01C 7/082; A01C 7/081; A01C 19/02; A01C 19/00
USPC ........................................................ 111/178
See application file for complete search history.

(56) References Cited

U.S. PATENT DOCUMENTS

| | | | | |
|---|---|---|---|---|
| 1,075,813 A | * | 10/1913 | Broman et al. | ........ A01C 7/121 222/268 |
| 3,447,758 A | | 6/1969 | Oznobichine | |
| 3,489,321 A | * | 1/1970 | Kirschmann | .......... A01C 7/121 111/36 |

(Continued)

FOREIGN PATENT DOCUMENTS

| | | | | |
|---|---|---|---|---|
| AU | 2007201262 | | 4/2007 | |
| CA | 2490876 A1 | * | 2/2004 | ............. A01C 7/081 |

(Continued)

OTHER PUBLICATIONS

1910 Tow-Behind Air Commodity Cart, Deere & Company, https://www.deere.com/en_US/products/equipment/planting_and_seeding_equipment/air_seeding/1910_commodity_air_cart/1910_commodity_air_cart.page, 2017, 3pgs.

(Continued)

*Primary Examiner* — Christopher J. Novosad
(74) *Attorney, Agent, or Firm* — Rebecca L. Henkel; Rickard K. DeMille

(57) ABSTRACT

A meter roller for an agricultural metering system includes multiple flutes and recesses. The flutes and recesses are arranged on one or more segments in one or more respective alternating patterns along a circumferential axis of the meter roller, and the flutes and recesses are configured to meter flowable particulate material from a storage tank to a material distribution system via rotation of the meter roller. In addition, each segment includes at least 12 flutes, each segment includes at least 12 recesses, and an aggregate volume of the recesses is between about 80,000 mm³ and about 84,000 mm³.

20 Claims, 14 Drawing Sheets

(56) References Cited

U.S. PATENT DOCUMENTS

| | | | |
|---|---|---|---|
| 3,606,965 A | 9/1971 | Cortelou et al. | |
| 3,954,204 A | 5/1976 | Becker | |
| 3,982,670 A | 9/1976 | Brass | |
| 4,023,511 A | 5/1977 | Newman | |
| 4,053,088 A | 10/1977 | Grataloup | |
| 4,254,897 A | 3/1981 | Stocks | |
| 4,264,023 A | 4/1981 | Stocks et al. | |
| 4,379,664 A | 4/1983 | Klein et al. | |
| 4,453,866 A | 6/1984 | Ryan | |
| 4,500,017 A | 2/1985 | Machnee | |
| 4,537,333 A | 8/1985 | Bjerregaard | |
| 4,600,122 A | 7/1986 | Lundie et al. | |
| 4,896,616 A | 1/1990 | Wintersteiger et al. | |
| 5,003,894 A | 4/1991 | Lafferty | |
| 5,037,014 A | 8/1991 | Bliss | |
| 5,170,909 A | 12/1992 | Lundie et al. | |
| 5,314,090 A | 5/1994 | Alexander | |
| 5,549,060 A | 8/1996 | Schick et al. | |
| 5,601,209 A | 2/1997 | Barsi et al. | |
| 5,826,523 A | 10/1998 | Gregor | |
| 5,924,370 A | 7/1999 | Gregor et al. | |
| 5,944,233 A | 8/1999 | Bourne | |
| 5,996,515 A | 12/1999 | Gergor et al. | |
| 6,158,630 A | 12/2000 | Mayerle et al. | |
| 6,240,861 B1 | 6/2001 | Memory | |
| 6,564,730 B2 | 5/2003 | Crabb et al. | |
| 6,581,535 B2 | 6/2003 | Barry et al. | |
| 6,598,548 B2 | 7/2003 | Lempriere | |
| 7,083,069 B2 | 8/2006 | Wysong et al. | |
| 7,100,522 B2 | 9/2006 | Mayerle | |
| 7,305,925 B2* | 12/2007 | Pleyer | A01C 7/081 111/175 |
| 7,380,733 B2 | 6/2008 | Owenby et al. | |
| 7,428,874 B2 | 9/2008 | Jones et al. | |
| 7,810,580 B2 | 10/2010 | Swanson | |
| 7,849,806 B2 | 12/2010 | Wendte | |
| 7,854,206 B2 | 12/2010 | Horsch | |
| 8,166,895 B2 | 5/2012 | Dean et al. | |
| 8,196,534 B2 | 6/2012 | Meyer et al. | |
| 8,281,724 B2* | 10/2012 | Snipes | A01C 7/102 111/178 |
| 8,434,416 B2* | 5/2013 | Kowalchuk | A01C 7/126 111/178 |
| 8,511,242 B2 | 8/2013 | Applegate et al. | |
| 8,617,630 B2 | 12/2013 | Swenson et al. | |
| 8,671,857 B2 | 3/2014 | Kowalchuk et al. | |
| 8,701,576 B2 | 4/2014 | Friggstad | |
| 8,733,259 B2* | 5/2014 | Beaujot | A01C 7/126 111/178 |
| 8,925,471 B2 | 1/2015 | Adams et al. | |
| 8,985,396 B2 | 3/2015 | Jersey et al. | |
| 9,144,190 B2 | 9/2015 | Henry et al. | |
| 9,254,052 B2 | 2/2016 | Villarreal | |
| 9,265,188 B2 | 2/2016 | Thompson et al. | |
| 9,392,741 B2 | 7/2016 | Kowalchuk et al. | |
| 9,420,738 B2 | 8/2016 | Walter | |
| 9,516,805 B2 | 12/2016 | Henry et al. | |
| 2012/0031315 A1 | 2/2012 | Beaujot | |
| 2012/0174844 A1* | 7/2012 | Friggstad | A01C 7/125 111/175 |
| 2012/0325131 A1* | 12/2012 | Thompson | A01C 7/08 111/178 |
| 2015/0163990 A1 | 6/2015 | Audigie et al. | |
| 2015/0216109 A1* | 8/2015 | Meyer | A01C 7/081 222/334 |
| 2016/0120111 A1 | 5/2016 | Gervais et al. | |
| 2016/0120113 A1 | 5/2016 | Kowalchuk et al. | |
| 2017/0055436 A1* | 3/2017 | Thompson | A01C 7/081 |

FOREIGN PATENT DOCUMENTS

| | | |
|---|---|---|
| WO | 2016135174 | 9/2016 |
| WO | WO2016135174 | 9/2016 |

OTHER PUBLICATIONS

Case IH Announces Revolutionary, New 2000 Series Early Riser® Planter, Nov. 23, 2015, 4 pgs.
Abati Titanium, Abati Agriculture Machinery, https://www.caseih.com/apac/en-int/products/planting-seeding/precision-air-carts, accessed Feb. 14, 2017, 5 pgs.
How to Change Meter Rollers, John Deere, OMA85532: 1910 Commodity Air Cart, http://manuals.deere.com/omview/OMA85532_19/OUO6076_0000203_19_08JUN07_1.htm, Jun. 8, 2007, 6 pgs.
Chapter 6 Seeders for 2 and 4-Wheel Tractors, tcp/cpr/2907-3101; chap6a, http://www.fao.org/Ag/agp/agpc/doc/tibetmanual/06A.2_rotary_seeddrill.htm, last visited Feb. 9, 2017, 10 pgs.
U.S. Appl. No. 15/458,607, filed Mar. 14, 2017, Guillaume Cloutier Boily.
U.S. Appl. No. 15/458,659, filed Mar. 14, 2017, Guillaume Cloutier Boily.
U.S. Appl. No. 29/596,843, filed Mar. 10, 2017, Guillaume Cloutier Boily.
U.S. Appl. No. 29/596,846, filed Mar. 10, 2017, Guillaume Cloutier Boily.
U.S. Appl. No. 15/454,982, filed Mar. 9, 2017, Guillaume Cloutier Boily.
U.S. Appl. No. 15/455,002, filed Mar. 9, 2017, Guillaume Cloutier Boily.
U.S. Appl. No. 15/455,019, filed Mar. 9, 2017, Guillaume Cloutier Boily.
U.S. Appl. No. 29/596,652, filed Mar. 9, 2017, Guillaume Cloutier Boily.
"Air-Seeding Equipment," John Deere, 2015, 40 pgs (see, e.g., p. 31).

* cited by examiner

METER ROLLER FOR AN AGRICULTURAL METERING SYSTEM

BACKGROUND

The disclosure relates generally to a meter roller for an agricultural metering system.

Generally, seeding implements (e.g., seeders) are towed behind a tractor or other work vehicle via a mounting bracket secured to a rigid frame of the implement. Seeding implements typically include multiple row units distributed across a width of the implement. Each row unit is configured to deposit seeds at a target depth beneath the soil surface of a field, thereby establishing rows of planted seeds. For example, each row unit typically includes a ground engaging tool or opener that forms a seeding path (e.g., trench) for seed deposition into the soil. A seed tube (e.g., coupled to the opener) is configured to deposit seeds and/or other agricultural products (e.g., fertilizer) into the trench. The opener/seed tube may be followed by closing discs that move displaced soil back into the trench and/or a packer wheel that packs the soil on top of the deposited seeds.

In certain configurations, an air cart is used to meter and deliver agricultural product (e.g., seeds, fertilizer, etc.) to the row units of the seeding implement. The air cart generally includes a storage tank (e.g., a pressurized tank), an air source (e.g., a blower), and a metering system. The product is typically gravity fed from the storage tank to the metering system which distributes a desired volume of product into an air flow generated by the air source. The air flow carries the product to the row units via conduits extending between the air cart and the seeding implement. The metering system typically includes meter rollers that regulate the flow of product based on meter roller geometry and rotation rate.

BRIEF DESCRIPTION

In one embodiment, a meter roller for an agricultural metering system includes multiple flutes and recesses. The flutes and recesses are arranged on one or more segments in one or more respective alternating patterns along a circumferential axis of the meter roller, and the flutes and recesses are configured to meter flowable particulate material from a storage tank to a material distribution system via rotation of the meter roller. In addition, each segment includes at least 12 flutes, each segment includes at least 12 recesses, and an aggregate volume of the recesses is between about 80,000 $mm^3$ and about 84,000 $mm^3$.

In another embodiment, a meter roller for an agricultural metering system includes one or more segments each having multiple flutes and recesses. The flutes and recesses of each segment are arranged in an alternating pattern along a circumferential axis of the meter roller, and the flutes and recesses of each segment are configured to meter flowable particulate material from a storage tank to a material distribution system via rotation of the meter roller. In addition, each segment includes a first shoulder positioned on a first longitudinal side the flutes and recesses, and a second shoulder positioned on a second longitudinal side of the flutes and recesses, opposite the first longitudinal side. Furthermore, each segment includes at least 12 flutes, each segment includes at least 12 recesses, and an aggregate volume of the recesses of the one or more segments is between about 17,400 $mm^3$ and about 17,600 $mm^3$.

In a further embodiment, a meter roller for an agricultural metering system includes one or more segments each having multiple flutes and recesses. The flutes and recesses of each segment are arranged in an alternating pattern along a circumferential axis of the meter roller, and the flutes and recesses of each segment are configured to meter flowable particulate material from a storage tank to a material distribution system via rotation of the meter roller. In addition, each segment includes a first shoulder positioned on a first longitudinal side the flutes and recesses, and a second shoulder positioned on a second longitudinal side of the flutes and recesses, opposite the first longitudinal side. Furthermore, a radial distance between an outer circumferential surface of each flute of each segment and a periphery of the first shoulder of the segment is greater than 4 mm, and an aggregate volume of the recesses of the one or more segments is between about 17,400 $mm^3$ and about 17,600 $mm^3$.

DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

Figure 1:
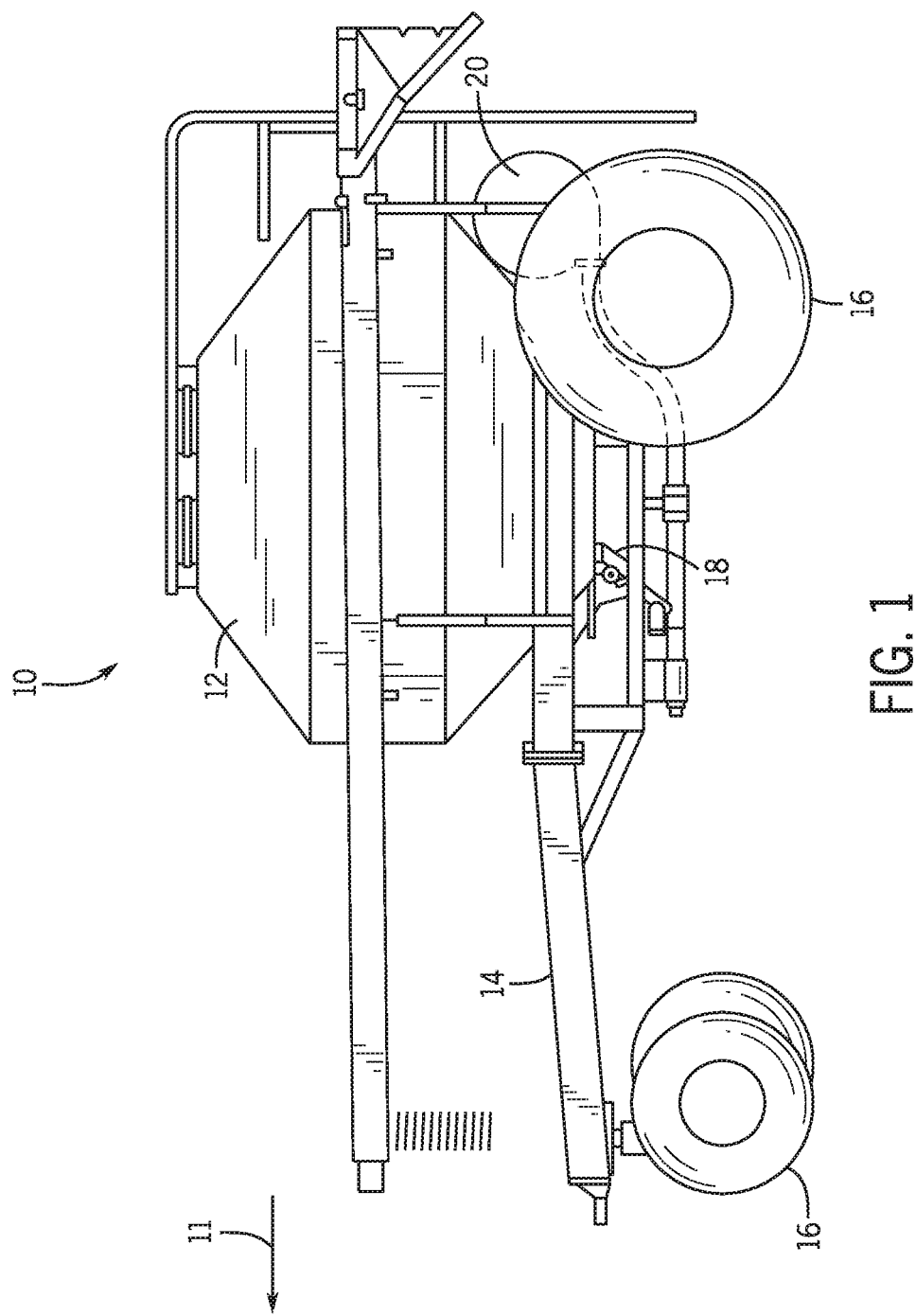
FIG. 1 is a side view of an embodiment of an air cart, including a metering system configured to regulate a flow of particulate material.

Turning now to the drawings, FIG. 1 is a side view of an air cart 10 that may be used in conjunction with a towable agricultural implement to deposit seeds into soil. For example, certain agricultural implements include row units configured to open the soil, dispense seeds into the soil opening, and re-close the soil. Such implements are generally coupled to a tow vehicle, such as a tractor, and pulled through a field. In certain configurations, seeds are conveyed to the row units by the illustrated air cart 10, which is generally towed in sequence with the implement along a direction of travel 11 (e.g., behind the implement or in front of the implement). In certain configurations, the air cart 10 may be configured to provide fertilizer to the row units, or a combination of seeds and fertilizer.

In the illustrated embodiment, the air cart 10 includes a storage tank 12, a frame 14, wheels 16, a metering system 18, and an air source 20. In certain configurations, the storage tank 12 includes multiple compartments for storing various flowable particulate materials (e.g. products). For example, one compartment may include seeds, such as canola or mustard, and another compartment may include a dry fertilizer. In such configurations, the air cart 10 is configured to deliver both the seeds and fertilizer to the implement. The frame 14 includes a towing hitch configured to couple to the implement or tow vehicle. As discussed in detail below, seeds and/or fertilizer within the storage tank 12 are gravity fed into the metering system 18. The metering system 18 includes one or more meter rollers that regulate the flow of material from the storage tank 12 into an air flow provided by the air source 20. The air flow then carries the material to the implement by pneumatic conduits. In this manner, the row units receive a supply of seeds and/or fertilizer for deposition within the soil.

Figure 2:
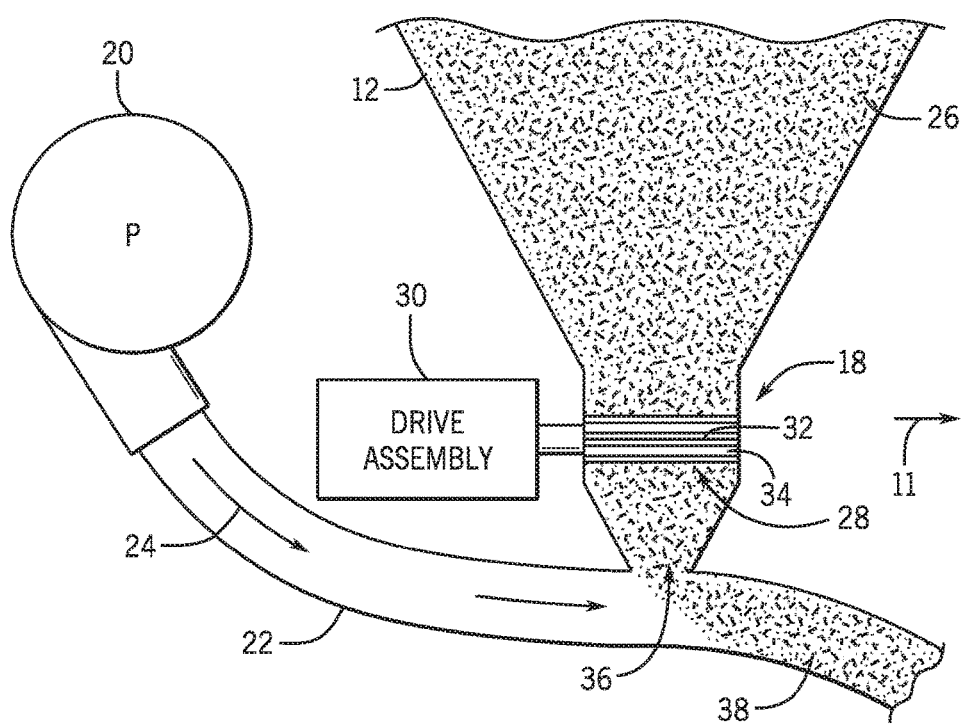
FIG. 2 is a schematic view of an embodiment of a metering system that may be employed within the air cart of FIG. 1.

FIG. 2 is a schematic view of the metering system 18, as shown in FIG. 1. As illustrated, the air source 20 is coupled to a conduit 22 configured to flow air 24 past the metering system 18. The air source 20 may be a pump or blower powered by an electric or hydraulic motor, for example. Flowable particulate material 26 (e.g., seeds, fertilizer, other products, etc.) within the storage tank 12 flows by gravity into the metering system 18. In certain embodiments, the storage tank 12 is pressurized such that a static pressure in the tank 12 is greater than a static pressure in the conduit 22, thereby facilitating an even flow of material through the metering system 18. The metering system 18 includes one or more meter rollers 28 configured to regulate the flow of material 26 into the air flow 24. In certain embodiments, the metering system 18 may include multiple meter rollers 28 (e.g., housed within individual meter boxes) disposed adjacent to one another. In addition, certain metering systems 18 may include twelve meter rollers 28, each housed within an individual meter box and each configured to flow particulate material into a respective conduit 22 (e.g., of a material distribution system) for distribution to one or more respective row units of the agricultural implement. However, in alternative embodiments, the metering system 18 may include more or fewer meter rollers, e.g., 1, 2, 3, 4, 5, 6, 7, 8, 9, 10, 11, 13, or more. By independently adjusting the rotation speed of each meter roller, product flow to different portions of the implement may be particularly controlled.

In the illustrated embodiment, the meter roller 28 is coupled to a drive assembly 30 configured to drive the meter roller 28 to rotate. In certain embodiments, the drive assembly 30 includes at least one drive unit, such as an electric or hydraulic motor, configured to drive one or more meter rollers to rotate. For example, in certain embodiments, multiple drive units may be coupled to respective meter rollers to facilitate independent control of the rotation rates of the meter rollers. In further embodiments, the drive assembly 30 may be coupled to a wheel (e.g., via a gear assembly) such that rotation of the wheel drives the meter roller 28 to rotate. Such a configuration automatically varies the rotation rate of the meter roller 28 based on the speed of the air cart.

The meter roller 28 also includes protrusions, such as the illustrated flutes 32, and recesses 34. Each respective recess 34 is disposed between a respective pair of flutes 32. As the meter roller 28 rotates, the respective pair of flutes 32 moves the material 26 (e.g., agricultural product) disposed within the respective recess 34 downwardly, thereby transferring the material 26 to the conduit 22. The number and geometry of the flutes 32 are particularly configured to accommodate the material 26 being distributed. Certain meter rollers 28 may include six flutes 32 and a corresponding number of recesses 34. Alternative meter rollers may include more or fewer flutes 32 and/or recesses 34. For example, the meter roller 28 may include 1, 2, 3, 4, 5, 6, 7, 8, 9, 10, 11, 12, 13, 14, 15, 16, 17, 18, 19, 20, or more flutes 32 and/or recesses 34. In addition, the depth of the recesses 34 and/or the height of the flutes 32 are configured to accommodate the material 26 within the storage tank 12. For example, a meter roller having deeper recesses 34 and fewer flutes 32 may be employed for larger seeds, while a meter roller having shallower recesses 34 and more flutes 32 may be employed for smaller seeds. Other parameters such as flute pitch (i.e., angle of the flute relative to a longitudinal/rotational axis) and flute angle (i.e., angle of the flute relative to a radial axis) may also be particularly selected to accommodate the material 26. While the illustrated meter roller includes flutes, it should be appreciated that in alternative embodiments, the meter roller may include other protrusions, and/or the recesses may be omitted.

In the illustrated embodiment, the rotationally axis of the meter roller 28 is oriented substantially parallel to the direction of travel 11 of the air cart. As used herein, substantially parallel may refer to an angle of about 0 to about 45 degrees, about 0 to about 30 degrees, about 0 to about 15 degrees, about 0 to about 5 degrees, or about 0 to about 1 degree relative to an axis/direction (e.g., the direction of travel 11). By way of example, substantially parallel may refer to an angle less than 5 degrees, less than 4 degrees, less than 3 degrees, less than 2 degrees, less than 1 degree, or less than 0.5 degrees relative to an axis/direction. In further embodiments, the meter roller may be oriented substantially perpendicular to the direction of travel, or at any other suitable angle.

For a particular meter roller configuration/profile, the rotation rate of the meter roller 28 controls the flow of material 26 into the air flow 24. For example, as the meter roller 28 rotates, the meter roller transfers material through an opening 36 in the metering system 18 into a respective conduit 22 (e.g., into a conduit associated with a respective row unit or group of row units). The material then mixes with air from the air source 20, thereby forming an air/material mixture 38. The mixture then flows to the respective row unit(s) of the implement via pneumatic conduit(s), where the seeds and/or fertilizer are deposited within the soil.

Different flowable particulate materials may include particles of different sizes. For example, seeds, such as sunflower, may have a coarse particle size, fertilizer, such as monoammonium phosphate (MAP), may have a medium particle size, and inoculant, such as a granular microbial soil inoculant, may have a fine particle size. Moreover, the target application rate may vary based on the type of flowable particulate material being dispensed. For example, the target flow rate of certain seeds or fertilizers may be higher than the target flow rate of other seeds or fertilizers. Accordingly, certain embodiments of the metering system disclosed herein may facilitate removal and replacement of meter rollers, thereby enabling an operator to select a meter roller suitable for a particular flowable particulate material and for a target dispensing rate (e.g., a target rate for particular field conditions, climate, expected yield, etc.).

Figure 3:
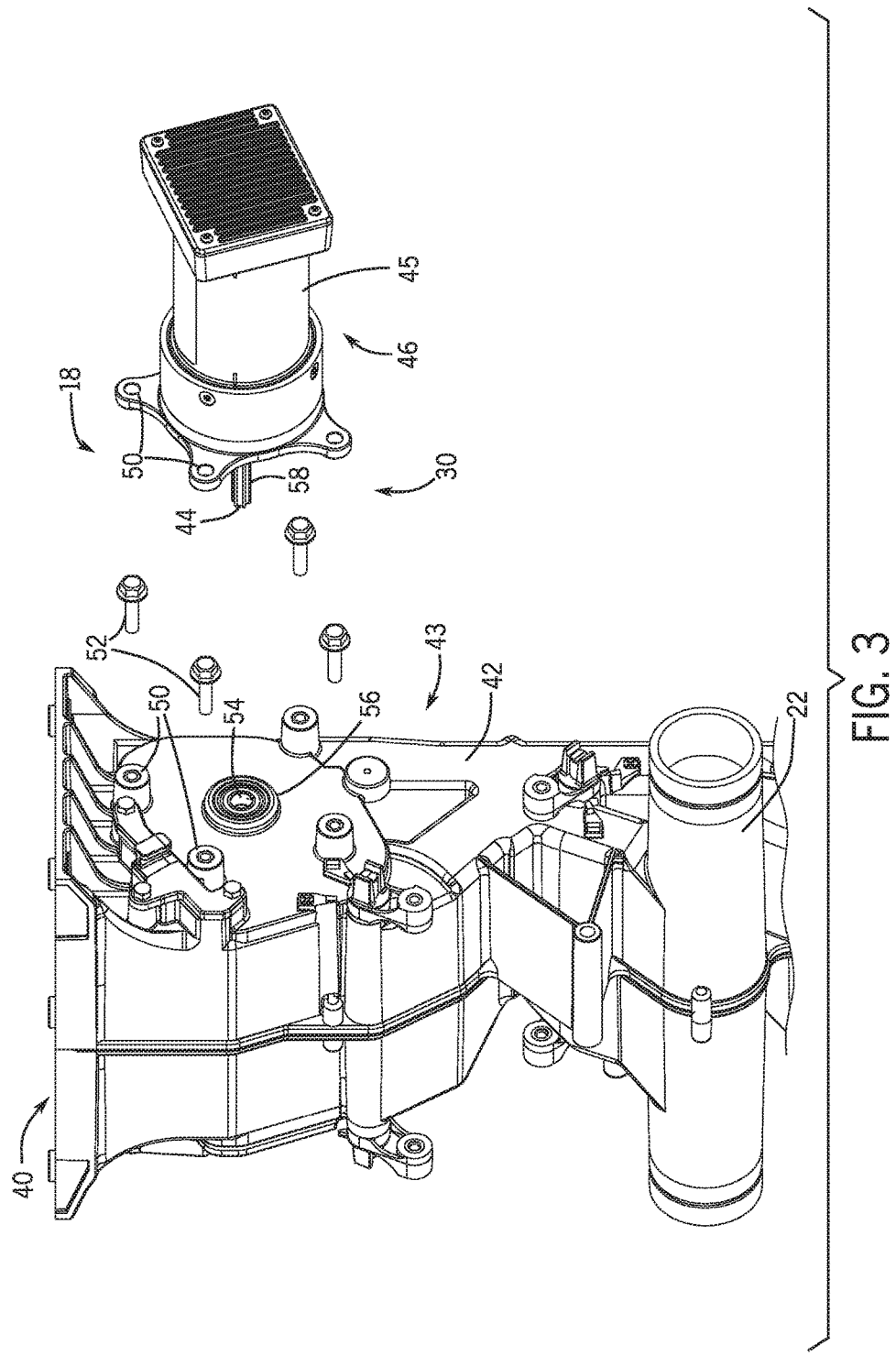
FIG. 3 is an exploded perspective view of an embodiment of a metering system that may be employed within the air cart of FIG. 1.

FIG. 3 is an exploded perspective view of an embodiment of a metering system 18 that may be employed within the air cart of FIG. 1. The metering system 18 includes a meter box 40 and a drive assembly 30. The meter box 40 has a passage 42 configured to direct the flowable particulate material to the conduit 22 for transfer to a row unit or group of row units. As shown in FIG. 3, the meter box 40 has a first side 43 (e.g., drive side) for receiving a drive unit 46 of the drive assembly 30. In the illustrated embodiment, the drive unit 46 includes a drive shaft 44 and a motor (e.g., electric motor) 45 that drives the drive shaft to rotate in a clockwise or counter-clockwise direction. The drive unit 46 and the meter box 40 include apertures 50 configured to receive fasteners (e.g., bolts) 52 to secure the drive unit 46 to the meter box 40. The drive shaft 44 is inserted into an opening 54 in the meter box such that the drive shaft 44 engages the meter roller within the meter box 40. The drive shaft 44 is configured to drive the meter roller to rotate. A bearing (e.g., ball bearing) 56 facilitates rotation of the drive shaft 44 and meter roller within the meter box 40. As the conduit 22 transfers air under the passage 42, the motor (e.g., electric motor) of the drive unit 46 drives the drive shaft 44 to rotate the meter roller. As the meter roller rotates, the meter roller dispenses flowable particulate material via the passage 42 to the air flow within the conduit 22 to form the air/material mixture. Further, pressurized air from the tank may flow through the passage 42 with the material from the meter roller.

In the illustrated embodiment, the drive shaft 44 includes a first engagement feature 58, such as protrusions, configured to non-rotatably couple the drive shaft 44 to the meter roller. The protrusions may engage corresponding recesses of the meter roller, thereby non-rotatably coupling the drive shaft 44 to the meter roller. While the drive unit 46 includes an electric motor in the illustrated embodiment, it should be appreciated that in alternative embodiments, the drive unit may include any other suitable system configured to drive rotation of the meter roller, such as a hydraulic motor, a pneumatic motor, or a gear assembly coupled to a wheel of the air cart.

Figure 4:
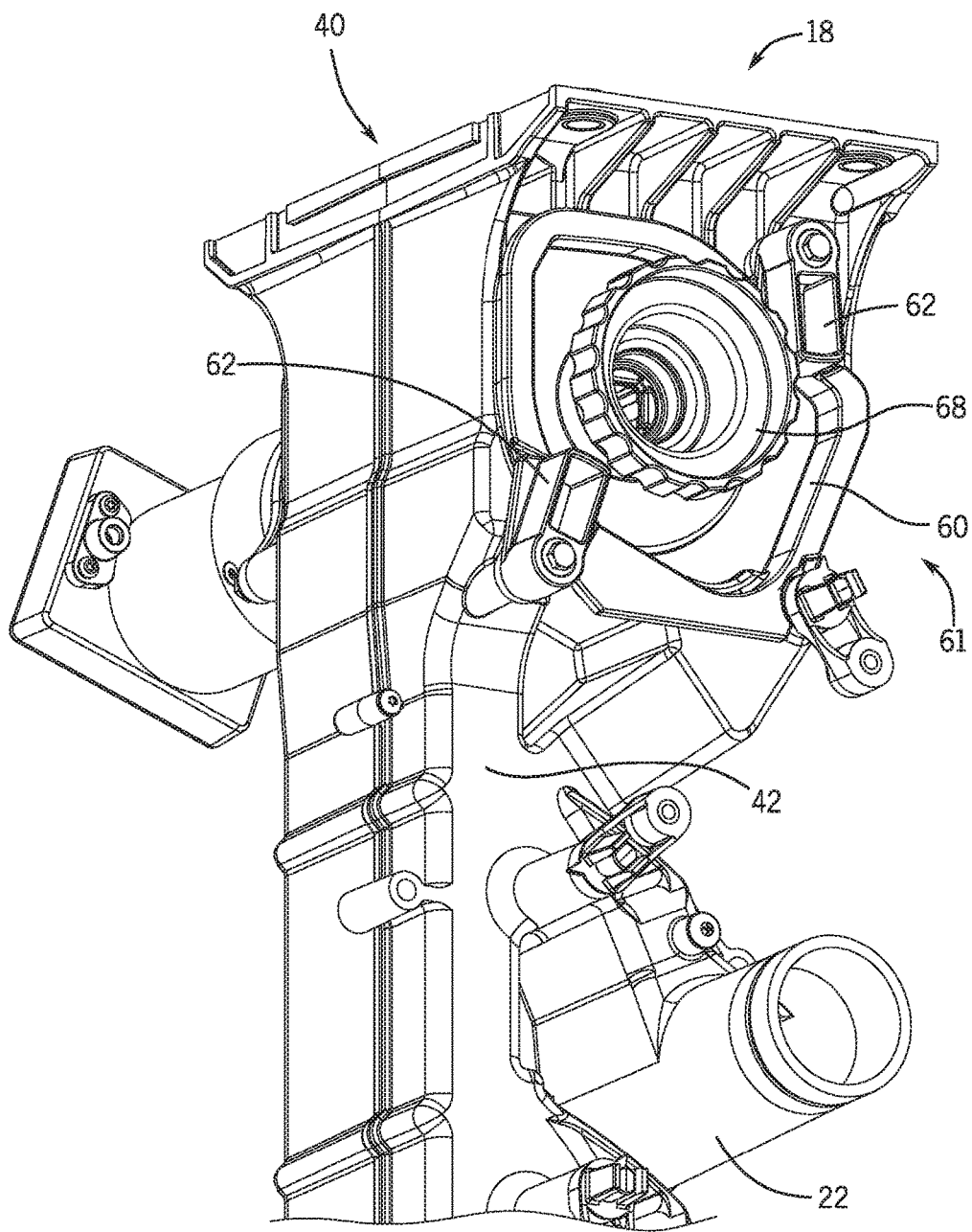
FIG. 4 is a perspective view of the metering system of FIG. 3, in which a cartridge is disposed within a meter box.

FIG. 4 is a perspective view of the metering system 18 of FIG. 3, in which a cartridge 60 is disposed within the meter box 40. As discussed in detail below, the cartridge 60 (e.g., meter roller cartridge, modular meter roller cartridge) is configured to facilitate removal and installation of the meter roller via a meter box opening on a second side 61 (e.g., cartridge side) of the meter box 40. As illustrated, the meter box 40 houses the cartridge 60 while the cartridge is disposed within the opening. While the cartridge 60 is housed within the meter box 40 of the metering system 18 in the illustrated embodiment, it should be appreciated that in alternative embodiments, the meter box may house a meter roller without a cartridge, or the meter box may house multiple cartridges (e.g., 2, 3, 4, 5, 6, or more).

In the illustrated embodiment, the metering system 18 is configured to enable the cartridge 60 to engage the meter box 40 via the meter box opening in the second side 61 (e.g., cartridge side) of the meter box 40. While the cartridge 60 is engaged with the meter box 40, the shaft of the drive unit engages the meter roller, thereby enabling the meter roller to be driven in rotation. The cartridge 60 has a cross-sectional shape that substantially corresponds to the cross-sectional shape of the meter box opening. As illustrated, the meter box 40 includes two cartridge locking tabs 62 configured to selectively block removal of the cartridge 60 from the meter box 40, thereby retaining the cartridge 60 within the meter box 40. In the illustrated embodiment, each locking tab 62 is part of a rotatable latch configured to rotate between the illustrated locked position that blocks removal of the cartridge 60 from the meter box 40 and an unlocked position that facilitates removal of the cartridge 60 from the meter box 40. In certain embodiments, each cartridge locking tab includes a recess that engages a corresponding notch on the cartridge 60 to block unintentional rotation of the rotatable latch while the rotatable latch is in the locked position (e.g., due to vibrations of the air cart). The cartridge 60 may be removed by rotating each rotatable latch in a respective first direction and extracting the cartridge 60. Further, the cartridge 60 may be inserted by engaging the cartridge with the meter box 40, and then rotating each latch in a respective second direction, opposite the respective first direction. While each cartridge locking tab 62 is part of a rotatable latch in the illustrated embodiment, it should be appreciated that in alternative embodiments, the cartridge locking tab may be part of a spring latch, a bolt latch, or any suitable type of locking mechanism. Furthermore, while the illustrated meter box includes two locking tabs, it should be appreciated that in alternative embodiments, the meter box may include more or fewer locking tabs (e.g., 1, 2, 3, 4, etc.). In the illustrated embodiment, the cartridge 60 includes a releasable bearing coupler 68. As discussed in detail below, the releasable bearing coupler 68 retains the meter roller within the cartridge, facilitates rotation of the meter roller within the cartridge, and facilitates removal of the meter roller from the cartridge.

Figure 5:
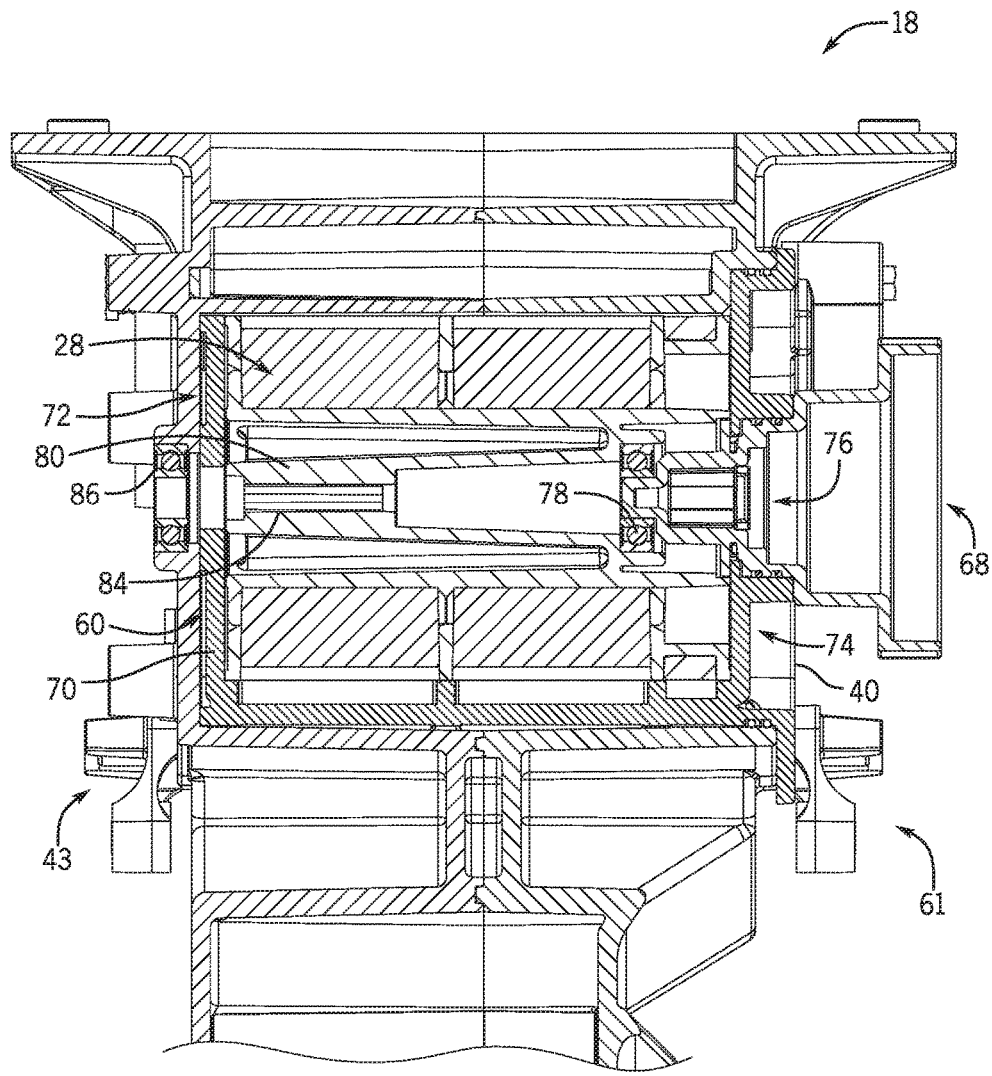
FIG. 5 is a cross-sectional view of the metering system of FIG. 3.

FIG. 5 is a cross-sectional view of the metering system 18 of FIG. 3. As illustrated, the cartridge 60 is engaged with/disposed within the meter box 40 of the metering system 18. The cartridge 60 includes a housing 70 configured to rotatably support the meter roller 28 within the meter box 40 (e.g., the housing 70 is secured to the meter box while the meter roller 28 rotates). The housing 70 includes a first side 72 (e.g., cartridge drive side) and a second side 74 (e.g., cartridge bearing side), which correspond to the first side 43 and second side 61 of the meter box 40, respectively.

The cartridge 60 includes a bearing opening 76 for receiving the releasable bearing coupler 68, and in certain embodiments, a meter roller bearing 78, which may engage the meter roller 28. The meter roller 28 includes a driven shaft 80 configured to engage the drive shaft of the drive unit, thereby non-rotatably coupling the drive shaft to the meter roller. The driven shaft 80 includes a second engagement feature 84 (e.g., recesses) configured to selectively engage the first engagement feature (e.g., protrusions) of the drive shaft. The driven shaft may be an integral part of a meter roller spindle, and the flutes and recesses of the meter roller may be formed on one or more meter roller inserts non-rotatably coupled to the spindle. While the second engagement feature includes recesses in the illustrated embodiment, it should be appreciated that in alternative embodiments, the second engagement feature may include a cavity having a polygonal cross-section and configured to engage the drive shaft having a corresponding polygonal cross-section (e.g., first engagement feature). Furthermore, while the illustrated second engagement feature 84 facilities shape-based engagement with the first engagement feature, it should be appreciated that in alternative embodiments, any variety of suitable interlocking mechanisms may be utilized for non-rotatably coupling the meter roller to the drive shaft.

In the illustrated embodiment, a drive bearing 86 is used to facilitate rotation of the drive shaft within the meter box. The drive bearing 86, the driven shaft 80, the drive shaft, and the meter roller bearing 78 associated with the releasable bearing coupler 68 are in longitudinal alignment, thereby facilitating rotation of the meter roller 28 in response to rotation of the drive shaft. The meter roller bearing 78 may be coupled to the releasable bearing coupler 68, the driven shaft 80, or it may be a separate individual element. While the cartridge 60 is engaged with/disposed within the meter box 40, the housing 70 rotatably supports/houses the meter roller 28. To change a meter roller 28, the operator may remove the cartridge 60, replace the meter roller 28, and then reinstall the cartridge 60. Alternatively, the operator may remove the cartridge 60 and replace the cartridge with another cartridge that contains a different meter roller or with a different cartridge type.

Figure 6:
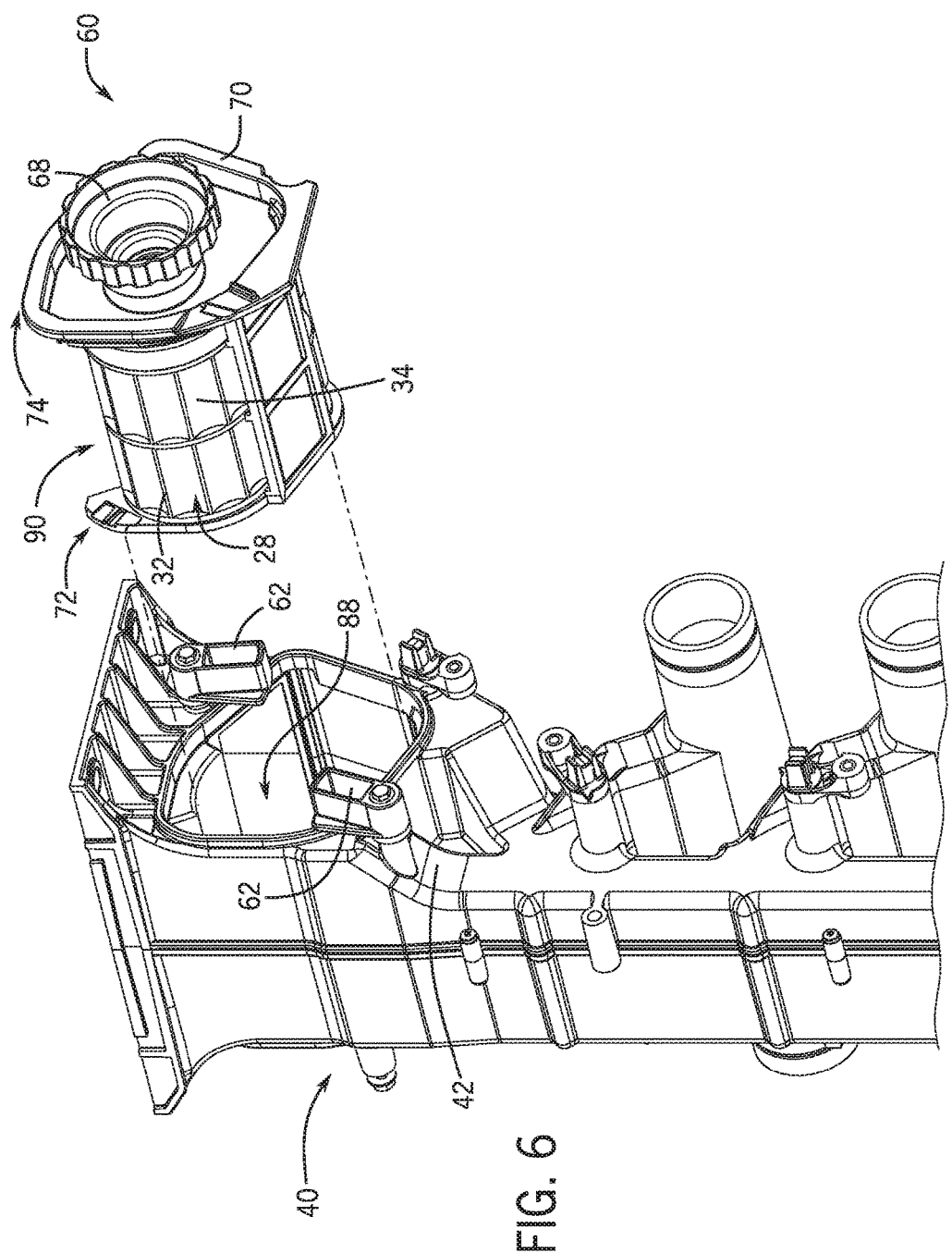
FIG. 6 is a perspective view of the metering system of FIG. 3, in which the cartridge is removed from the meter box.

FIG. 6 is a perspective view of the metering system of FIG. 3, in which the cartridge 60 is removed from the meter box 40. To remove the cartridge 60, the operator may rotate the rotatable latches to the unlocked position, in which the locking tabs 62 are positioned to facilitate removal of the cartridge, and extract the cartridge 60 from the meter box 40. As illustrated, the cross-sectional shape of the cartridge 60 (e.g., the cross-sectional shape of the first side 72, the cross-sectional shape of the second side 74, etc.) substantially correspond to the cross-sectional shape of the meter box opening 88.

As illustrated, the meter roller 28 includes flutes 32 and recesses 34, which are configured to enable the meter roller 28 to control the flow of the flowable particulate material into the passage 42. The meter roller 28 is rotatably supported on the second side 74 of the meter roller cartridge 60 by the releasable bearing coupler 68. Once the cartridge 60 is removed from the meter box 40, the releasable bearing coupler 68 may be disengaged and removed from the meter roller/housing. Once the rotatable bearing coupler 68 is removed, the meter roller 28 may be removed through an opening 90, thereby enabling insertion of another meter roller (e.g., suitable for use with material having a larger or small particle size, and/or for a higher or lower target application rate).

Figure 7:
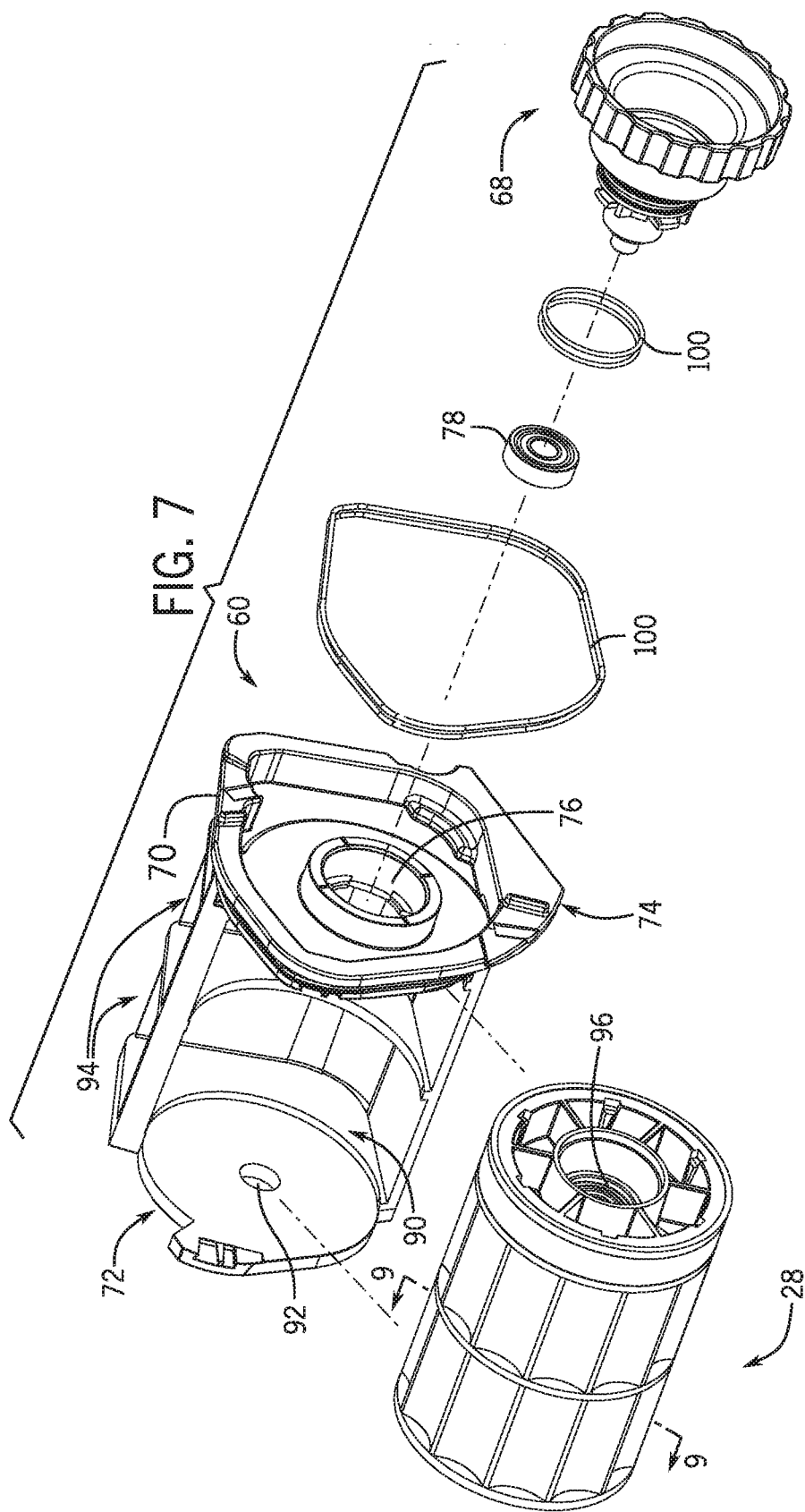
FIG. 7 is an exploded perspective view of the cartridge of FIG. 4, in which a meter roller is removed from a housing of the cartridge.

FIG. 7 is an exploded perspective view of the cartridge 60 of FIG. 4, in which the meter roller 28 is removed from the housing 70 of the cartridge 60. The housing 70 of the cartridge 60 has a drive shaft opening 92 on the first side 72 of the housing 70 and the bearing opening 76 on the second side 74 of the housing 70. The housing 70 also has the meter roller opening 90 and material receiving openings 94. The material receiving openings 94 are configured to receive the flowable particulate material into the housing 70, thereby enabling the meter roller 28 to receive the material.

To couple the meter roller 28 to the housing 70, the meter roller 28 is disposed within the housing 70 through the meter roller opening 90. While the meter roller 28 is disposed within the housing 70, the drive shaft opening 92 on the first side 72 of the housing 70 aligns with the drive shaft opening (e.g., a recess or interior cavity) of the driven shaft. In addition, the bearing opening 76 on the second side 74 of the housing 70 aligns with a bearing opening 96 (e.g., a recess or interior cavity) of the meter roller 28. The bearing opening 96 may be configured to receive the bearing 78 or the bearing may be fixedly mounted within the opening 96. The openings of the meter roller 28 and cartridge 60 are longitudinally aligned with one another and with the drive shaft.

The meter roller cartridge 60 and/or the releasable bearing coupler 68 may include gaskets 100. While two gaskets 100 (e.g., O-rings) are included in the illustrated embodiment, it should be appreciated that in alternative embodiments, any suitable number of gaskets (e.g., O-rings) may be used to seal adjacent parts. Once the meter roller 28 is disposed within the housing 70, the bearing opening 96 may receive the releasable bearing coupler 68, and in certain embodiments the meter roller bearing 78, via the bearing opening 76 in the housing 70. The meter roller bearing 78 may be fixedly coupled to the meter roller 28 or fixedly coupled to the releasable bearing coupler 68 in certain embodiments. In further embodiments, the meter roller bearing 78 may be an independent element. The releasable bearing coupler 68 may include the bearing 78, or the releasable bearing coupler 68 may be configured to engage the bearing 78 with a shaft of the releasable bearing coupler 68. Accordingly, the bearing 78 may be configured to engage the opening 96 of the meter roller 28 to facilitate rotation of the meter roller 28 relative to the housing 70 (e.g., rotation about the shaft of the releasable bearing coupler). The bearing coupler 68 is configured to engage the bearing opening 76 and to couple to the housing 70 via corresponding locking elements of the bearing coupler 68 and the housing 70. For example, the locking elements may interlock with one another via rotation of the bearing coupler 68 relative to the housing, thereby coupling the bearing coupler 68 to the housing 70. While the bearing coupler 68 is coupled to the housing 70, the shaft of the bearing coupler 68 rotatably supports the meter roller 28 and secures the meter roller to the housing 70.

Figure 8:
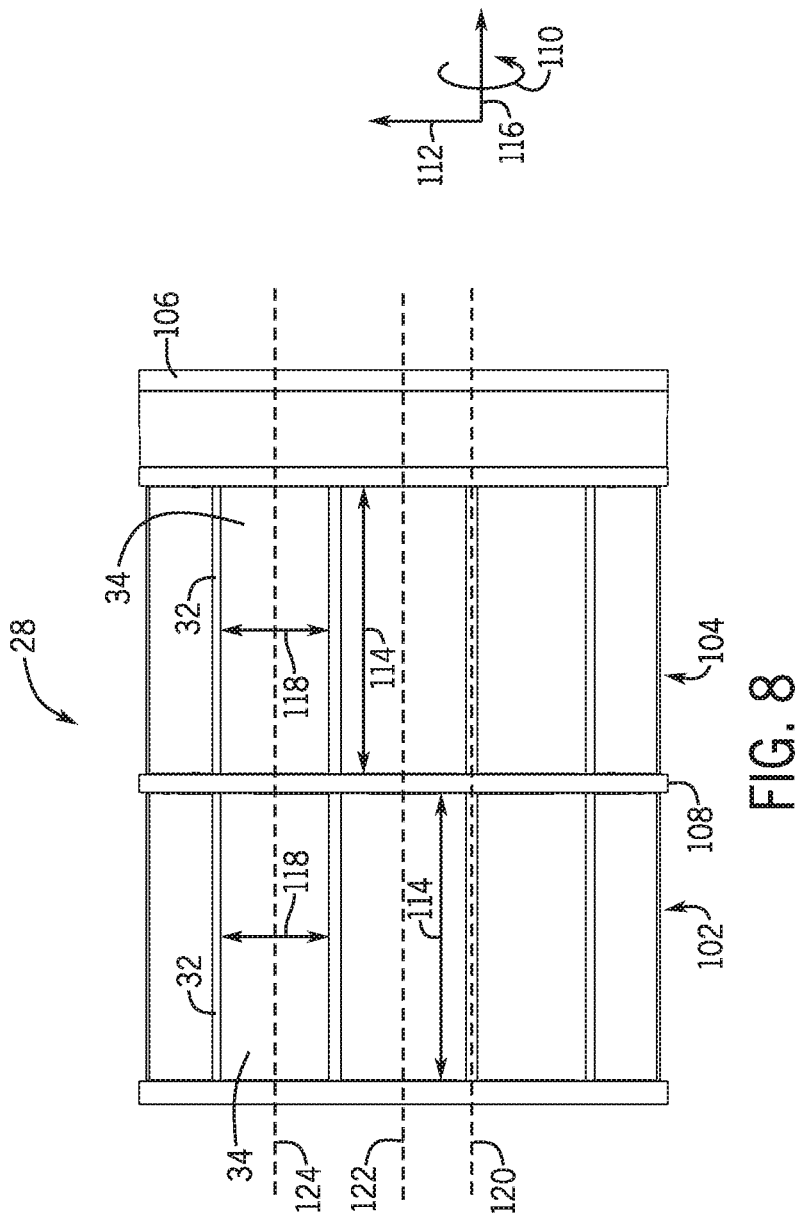
FIG. 8 is a top view of the meter roller of FIG. 7.

FIG. 8 is a top view of the meter roller 28 of FIG. 7. In the illustrated embodiment, the meter roller 28 includes a first segment 102 and a second segment 104. The first segment 102 and the second segment 104 are non-rotatably coupled to a spindle 106 and are separated from one another by a ring 108 of the spindle 106. The spindle 106 includes the driven shaft, which may be non-rotatably coupled to the drive shaft. Accordingly, rotation of the drive shaft drives the spindle, and the segments coupled to the spindle, to rotate.

As illustrated, each segment includes multiple flutes 32 and recesses 34 arranged in an alternating pattern along a circumferential axis 110 of the meter roller 28. The flutes 32 and recesses 34 of each segment are configured to meter the flowable particulate material from the storage tank to the material distribution system via rotation of the meter roller 28. As discussed in detail below, the depth of each recess (e.g., extent of each recess along a radial axis 112), a longitudinal extent 114 of the flutes and recesses (e.g., extent of the flutes and recesses along a longitudinal axis 116), and a circumferential extent 118 of each recess (e.g., extent of each recess along the circumferential axis 110) may be particularly selected to establish a desired volume of each recess 34. For example, in certain embodiments, the longitudinal extent 114 of the flutes and recesses (e.g., the longitudinal extent of each segment) may be between about 25 mm and about 100 mm, about 30 mm and about 90 mm, about 40 mm and about 60 mm, about 46 mm and about 49 mm, or about 47.5 mm.

In the illustrated embodiment, the longitudinal axis 120 of each flute 32 is substantially parallel to the rotational axis 122 of the meter roller 28. In addition, the longitudinal axis 124 of each recess 34 is substantially parallel to the rotational axis 122 of the meter roller 28. However, in alternative embodiments, the longitudinal axis of each flute and the longitudinal axis of each recess may be oriented at an angle (e.g., of at least 2 degrees) relative to the rotational axis of the meter roller. Furthermore, in certain embodiments, the flutes and recesses may follow a curved path from one longitudinal side of a segment to the other longitudinal side of the segment. While the flutes and recesses extent across an entire longitudinal extent of each segment in the illustrated embodiment, it should be appreciated that in alternative embodiments, at least one segment may include a shoulder, which does not include flutes or recesses, on at least one longitudinal end of the segment. Utilizing wider shoulder(s) may reduce the aggregate volume of the recesses of the segment, and utilizing narrower shoulder(s), or no shoulder, may increase the aggregate volume of the recesses for a particular flute/recess configuration.

While the meter roller 28 includes two segments in the illustrated embodiment, it should be appreciated that in alternative embodiments, the meter roller may include more or fewer segments (e.g., 1, 2, 3, 4, 5, 6, or more). For example, in certain embodiments, the meter roller may include a single segment that is not divided by a ring. In addition, while the illustrated meter roller includes segments mounted to a spindle, it should be appreciated that in alternative embodiments, the meter roller may be formed as a single element (e.g., have a single segment that extends along an entire longitudinal extent of the meter roller). Furthermore, while the longitudinal extents of the segments are substantially equal to one another in the illustrated embodiment, it should be appreciated that in alternative embodiments, the longitudinal extent of one segment may be greater or less than the longitudinal extent of another segment.

Figure 9:
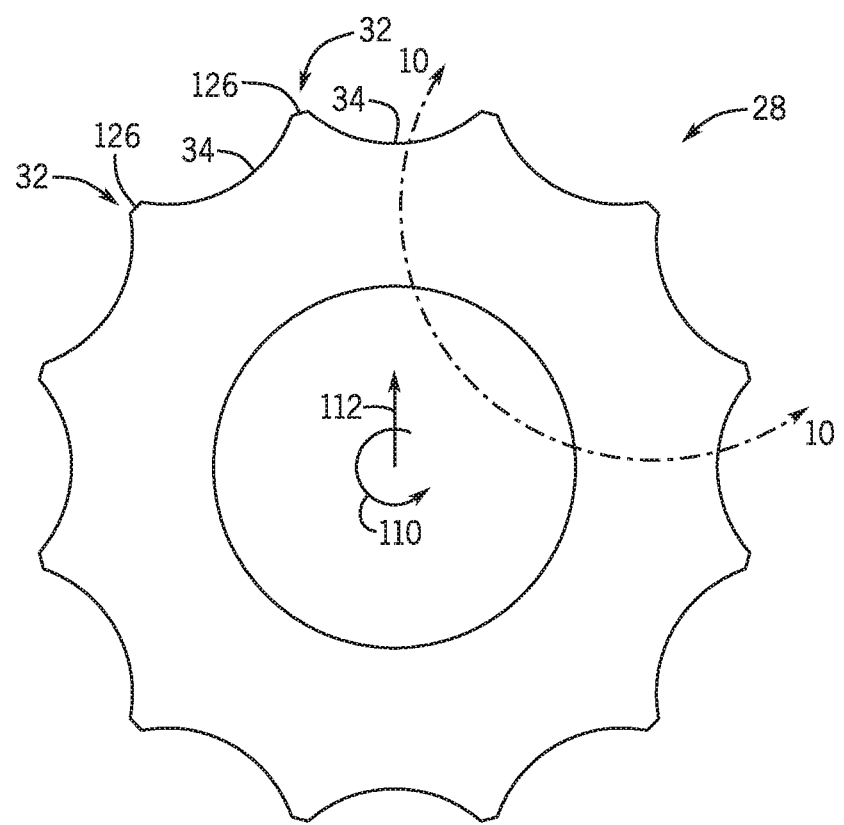
FIG. 9 is a cross-sectional view of the meter roller of FIG. 7, taken along line 9-9 of FIG. 7.

FIG. 9 is a cross-sectional view of the meter roller 28 of FIG. 7, taken along line 9-9 of FIG. 7. In the illustrated embodiment, the meter roller 28 includes 12 flutes 32 and 12 recesses 34. Utilizing 12 flutes and recesses (e.g., as compared to six flutes and recesses) may enhance the uniformity of the flow of particulate material from the meter roller to the material distribution system, thereby increasing the uniformity of the material distribution across the field. In addition, utilizing 12 flutes (e.g., as compared to six flutes) may substantially reduce the amount of particulate material that bypasses the meter roller during seeding operations (e.g., due to pressurized air from the storage tank driving particulate material around the meter roller via the spaces between the flutes). Accordingly, the accuracy of the metering process may be enhanced. While the illustrated meter roller includes 12 flutes and recesses, it should be appreciated that in alternative embodiments, the meter roller may include more or fewer flutes and recesses. For example, in certain embodiments, the meter roller may include 8, 10, 12, 14, 16, 18, 20, or more flutes and recesses. By way of further example, the meter roller may include at least 8, 10, 12, 14, 16, 18, or 20 flutes and recesses.

In the illustrated embodiment, each recess 34 has an arcuate concave cross-section. The arcuate cross-section may facilitate metering flowable particulate material having a medium particle size, such as a starter fertilizer (e.g., MAP). However, it should be appreciated that in alternative embodiments, each recess may have another shape suitable for receiving flowable particulate material (e.g., a polygonal cross-section, etc.). In addition, each flute 32 has a substantially flat outer circumferential surface 126. However, it should be appreciated that in alternative embodiments, each flute may have another shape suitable for blocking the flow of particulate material around the meter roller. For example, the outer circumferential surface of one or more flutes may be rounded or polygonal, among other suitable shapes.

Figure 10:
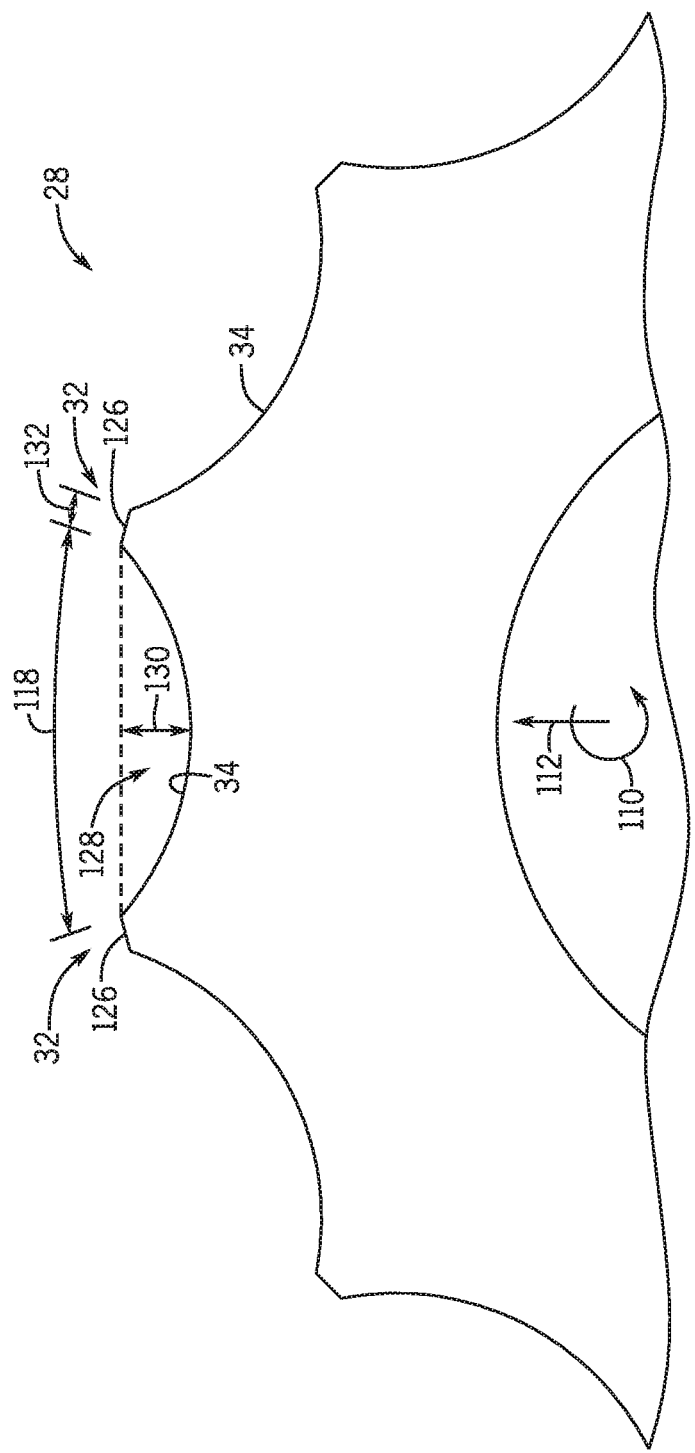
FIG. 10 is a detailed cross-sectional view of the meter roller of FIG. 7, taken within line 10-10 of FIG. 9.

FIG. 10 is a detailed cross-sectional view of the meter roller 28 of FIG. 7, taken within line 10-10 of FIG. 9. The aggregate volume of the recesses of the meter roller may be particularly configured to meter a particulate material having a medium particle size, such as a starter fertilizer (e.g., MAP). Accordingly, the volume of the recesses and the number of recesses may be particularly selected to achieve a target aggregate volume. For example, the target aggregate volume of the recesses of the meter roller may be between about 70,000 mm$^3$ and about 95,000 mm$^3$, about 75,000 mm$^3$ and about 90,000 mm$^3$, about 80,000 mm$^3$ and about 84,000 mm$^3$, or about 82,000 mm$^3$. Utilizing such a meter roller profile may enable the motor of the drive unit to rotate the meter roller at a speed sufficient to facilitate precise control of the meter roller rotation rate (e.g., as compared to rotating a meter roller having a larger aggregate recess volume slower than a minimum controllable speed of the motor).

In the illustrated embodiment, the meter roller includes two segments, and each segment has 12 recesses. Accordingly, to achieve a target aggregate volume of about 82,000 mm$^3$, the volume 128 of each recess may be about 3400 mm$^3$. However, to achieve a higher or lower target aggregate volume, the volume of each recess may be adjusted accordingly. In addition, if the meter roller includes more or fewer recesses, the volume of each recess may be adjusted to achieve the target aggregate volume.

In the illustrated embodiment, the longitudinal extent of each recess is about 47.5 mm. Accordingly, to achieve a recess volume of about 3400 mm$^3$, the cross-sectional area of each recess may be about 71.8 mm$^2$. However, it should be appreciated that if recesses having a larger or smaller longitudinal extent are utilized, the cross-sectional area of each recess may be adjusting accordingly. For example, the cross-sectional area of each recess may be between about 50 mm$^2$ and about 100 mm$^2$, about 60 mm$^2$ and about 90 mm$^2$, about 70 mm$^2$ and about 73 mm$^2$, or about 72 mm$^2$. In the illustrated embodiment, the target cross-sectional area of 71.8 mm$^2$ of each recess 34 is achieved by utilizing a depth 130 (e.g., extent of the recess along the radial axis 112) of about 5.1 mm and a circumferential extent 118 of about 20.6 mm. However, it should be appreciated that in certain embodiments, the depth of each recess may be between about 3 mm and about 7 mm, about 4 mm and about 6 mm, about 4.5 mm and about 5.5 mm, or about 5.1 mm. Furthermore, it should be appreciated that in certain embodiments, the circumferential extent of each recess may be between about 15 mm and about 25 mm, about 17 mm and about 23 mm, about 20 mm and about 21 mm, or about 20.6 mm.

In the illustrated embodiment, a circumferential extent 132 of each flute 32 (e.g., the circumferential extent of the outer circumferential surface of each flute) may be about 2 mm. However, it should be appreciated that in alternative embodiments, at least one flute may have a larger or smaller circumferential extent. For example, the circumferential extent of at least one flute (e.g., the circumferential extent of the outer circumferential surface of the flute) may be between about 0 and about 10 mm, about 2 and about 9 mm, about 2 and about 5 mm, or about 2 mm. The particular profile of the meter roller described with reference to FIGS. 8-10 may be particularly suited for metering particulate material having a medium particle size (e.g., starter fertilizer) at a medium application rate (e.g., about 4.5 to about 20.5 kg/acre), thereby enhancing the accuracy of the metering process. While all of the recesses in the illustrated embodiment have substantially equal depths and circumferential extents, it should be appreciated that in alternative embodiments, the depth and/or circumferential extent of one recess may be different than the depth and/or circumferential extent of another recess. In addition, while all of the flutes in the illustrated embodiment have substantially equal circumferential extents, it should be appreciated that in alternative embodiments, the circumferential extent of one flute may be different than the circumferential extent of another flute.

Figure 11:
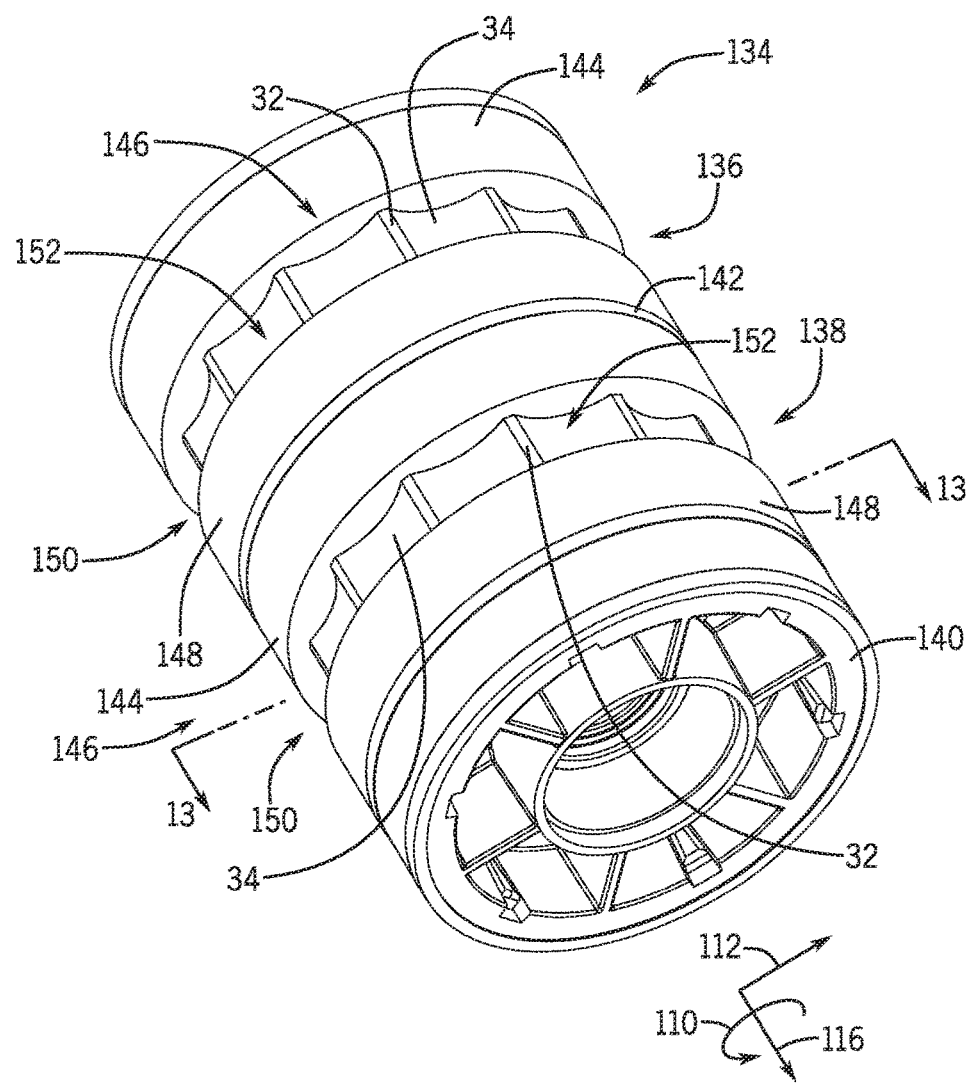
FIG. 11 is a perspective view of another embodiment of a meter roller that may be used in the cartridge of FIG. 4.

FIG. 11 is a perspective view of another embodiment of a meter roller 134 that may be used in the cartridge of FIG. 4. In the illustrated embodiment, the meter roller 134 includes a first segment 136 and a second segment 138. The first segment 136 and the second segment 138 are non-rotatably coupled to a spindle 140 and are separated from one another by a ring 142 of the spindle 140. The spindle 140 includes the driven shaft, which may be non-rotatably coupled to the drive shaft. Accordingly, rotation of the drive shaft drives the spindle, and the segments coupled to the spindle, to rotate.

As illustrated, each segment includes multiple flutes 32 and recesses 34 arranged in an alternating pattern along the circumferential axis 110 of the meter roller 134. The flutes 32 and recesses 34 of each segment are configured to meter the flowable particulate material from the storage tank to the material distribution system via rotation of the meter roller 134. In the illustrated embodiment, each segment includes a first shoulder 144 positioned on a first longitudinal side 146 of the flutes and recesses, and a second shoulder 148 positioned on a second longitudinal side 150 of the flutes and recesses, opposite the first longitudinal side 146. The shoulders form a channel 152 in each segment, and the flutes and recesses are positioned within the channel 152. As illustrated, the shoulders reduce the longitudinal extent of the flutes and recesses (e.g., as compared to a configuration in which the flutes and recesses extend across the entire longitudinal extent of the respective segment), thereby reducing the aggregate volume of the recesses of each segment.

While the meter roller 134 includes two segments in the illustrated embodiment, it should be appreciated that in alternative embodiments, the meter roller may include more or fewer segments (e.g., 1, 2, 3, 4, 5, 6, or more). For example, in certain embodiments, the meter roller may include a single segment that is not divided by a ring. In addition, while the illustrated meter roller includes segments mounted to a spindle, it should be appreciated that in alternative embodiments, the meter roller may be formed as a single element (e.g., have a single segment that extends along an entire longitudinal extent of the meter roller). Furthermore, while the longitudinal extents of the segments are substantially equal to one another in the illustrated embodiment, it should be appreciated that in alternative embodiments, the longitudinal extent of one segment may be greater or less than the longitudinal extent of another segment.

Figure 12:
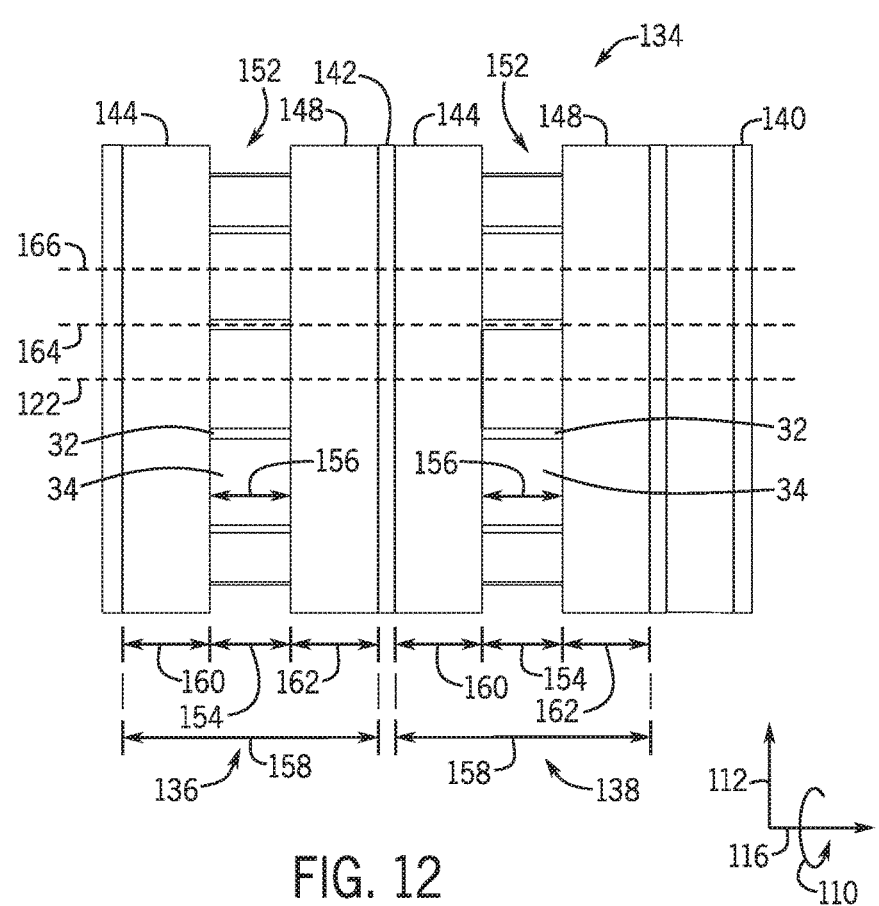
FIG. 12 is a top view of the meter roller of FIG. 11.

FIG. 12 is a top view of the meter roller 134 of FIG. 11. As illustrated, the first shoulder 144 and the second shoulder 148 form the channel 152, and the flutes 32 and recesses 34 are positioned within the channel 152. A longitudinal extent 154 of the channel 152 (e.g., the extent of the channel 152 along the longitudinal axis 116) may be particularly selected to establish a desired aggregate volume of the recesses of each segment. For example, a wider channel may increase the aggregate volume of the recesses of the segment, and a narrower channel may reduce the aggregate volume of the recesses. In the illustrated embodiment, the longitudinal extent 154 of the channel is about 15 mm. However, it should be appreciated that in certain embodiments, the longitudinal extent of the channel may be between about 5 mm and about 35 mm, about 10 mm and about 25 mm, or about 10 mm and about 20 mm. In the illustrated embodiment, the longitudinal extent 156 of the flutes and recesses (e.g., the extent of the flutes and recesses along the longitudinal axis 116) is equal to the longitudinal extent 154 of the channel. However, it should be appreciated that in alternative embodiments, the longitudinal extent of the channel may be greater than the longitudinal extent of the flutes and recesses.

In the illustrated embodiment, the longitudinal extent 158 of each segment (e.g., the extent of the segment along the longitudinal axis 116) is about 47.5 mm. However, it should be appreciated that in certain embodiments, the longitudinal extent of each segment may be between about 25 mm and about 100 mm, about 30 mm and about 90 mm, about 40 mm and about 60 mm, about 46 mm and about 49 mm, or about 47.5 mm. In the illustrated embodiment, the longitudinal extent 160 of the first shoulder 144 of each segment (e.g., the extent of the first shoulder 144 along the longitudinal axis 116) is about 16.2 mm. In addition, the longitudinal extent 162 of the second shoulder 148 of each segment (e.g., the extent of the second shoulder 148 along the longitudinal axis 116) is about 16.2 mm. However, it should be appreciated that in alternative embodiments, the longitudinal extent of the first shoulder and/or the longitudinal extent of the second shoulder may be between about 5 mm and about 25 mm, about 10 mm and about 20 mm, or about 16.2 mm. While the longitudinal extents of the shoulder are substantially equal to one another in the illustrated embodiment, it should be appreciated that in alternative embodiments, one shoulder may have a greater longitudinal extent than the other shoulder. Furthermore, in certain embodiments, at least one of the shoulders may be omitted, and in such embodiments, the flutes and recesses may extend to the respective longitudinal end of the segment.

In the illustrated embodiment, the longitudinal axis 164 of each flute 32 is substantially parallel to the rotational axis 122 of the meter roller 134. In addition, the longitudinal axis 166 of each recess 34 is substantially parallel to the rotational axis 122 of the meter roller 134. However, in alternative embodiments, the longitudinal axis of each flute and the longitudinal axis of each recess may be oriented at an angle (e.g., of at least 2 degrees) relative to the rotational axis of the meter roller. Furthermore, in certain embodiments, the flutes and recesses may follow a curved path from one longitudinal side of a segment to the other longitudinal side of the segment.

Figure 13:
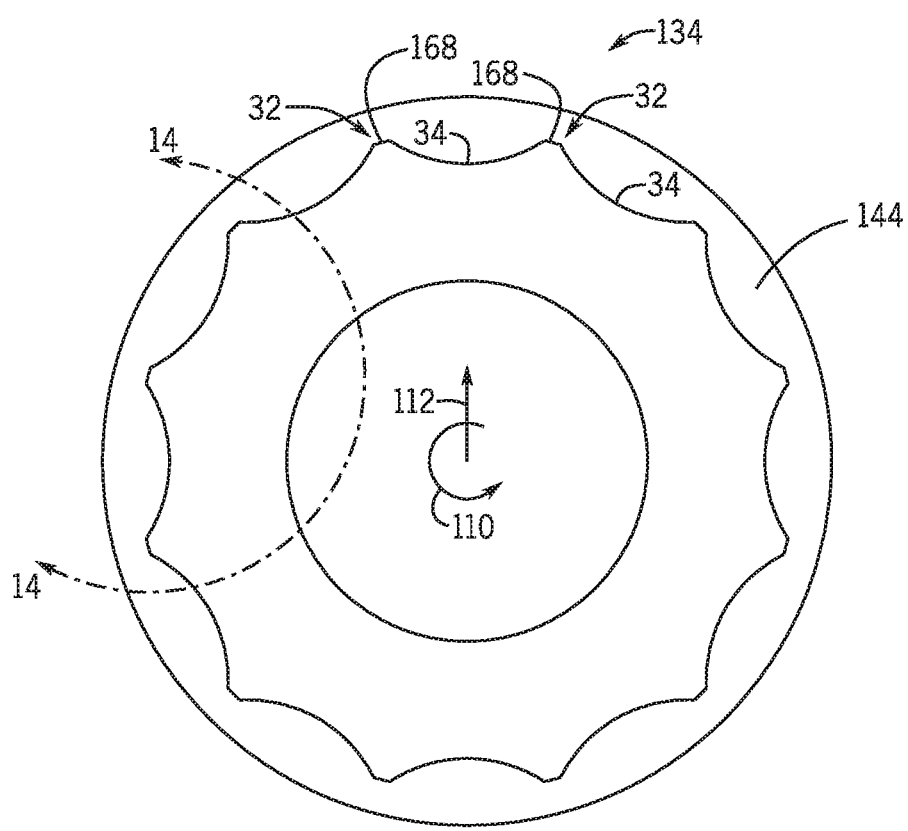
FIG. 13 is a cross-sectional view of the meter roller of FIG. 11, taken along line 13-13 of FIG. 11.

FIG. 13 is a cross-sectional view of the meter roller 134 of FIG. 11, taken along line 13-13 of FIG. 11. In the illustrated embodiment, the meter roller 134 includes 12 flutes 32 and 12 recesses 34. Utilizing 12 flutes and recesses (e.g., as compared to six flutes and recesses) may enhance the uniformity of the flow of particulate material from the meter roller to the material distribution system, thereby increasing the uniformity of the material distribution across the field. In addition, utilizing 12 flutes (e.g., as compared to six flutes) may substantially reduce the amount of particulate material that bypasses the meter roller during seeding operations (e.g., due to pressurized air from the storage tank driving particulate material around the meter roller via the spaces between the flutes). Accordingly, the accuracy of the metering process may be enhanced. While the illustrated meter roller includes 12 flutes and recesses, it should be appreciated that in alternative embodiments, the meter roller may include more or fewer flutes and recesses. For example, in certain embodiments, the meter roller may include 8, 10, 12, 14, 16, 18, 20, or more flutes and recesses. By way of further example, the meter roller may include at least 8, 10, 12, 14, 16, 18, or 20 flutes and recesses.

In the illustrated embodiment, each recess 34 has an arcuate concave cross-section. The arcuate cross-section may facilitate metering flowable particulate material having a coarse/large particle size, such as sunflower seeds. However, it should be appreciated that in alternative embodiments, each recess may have another shape suitable for receiving flowable particulate material (e.g., a polygonal cross-section, etc.). In addition, each flute 32 has a substantially flat outer circumferential surface 168. However, it should be appreciated that in alternative embodiments, each flute may have another shape suitable for blocking the flow of particulate material around the meter roller. For example, the outer circumferential surface of one or more flutes may be rounded or polygonal, among other suitable shapes.

Figure 14:
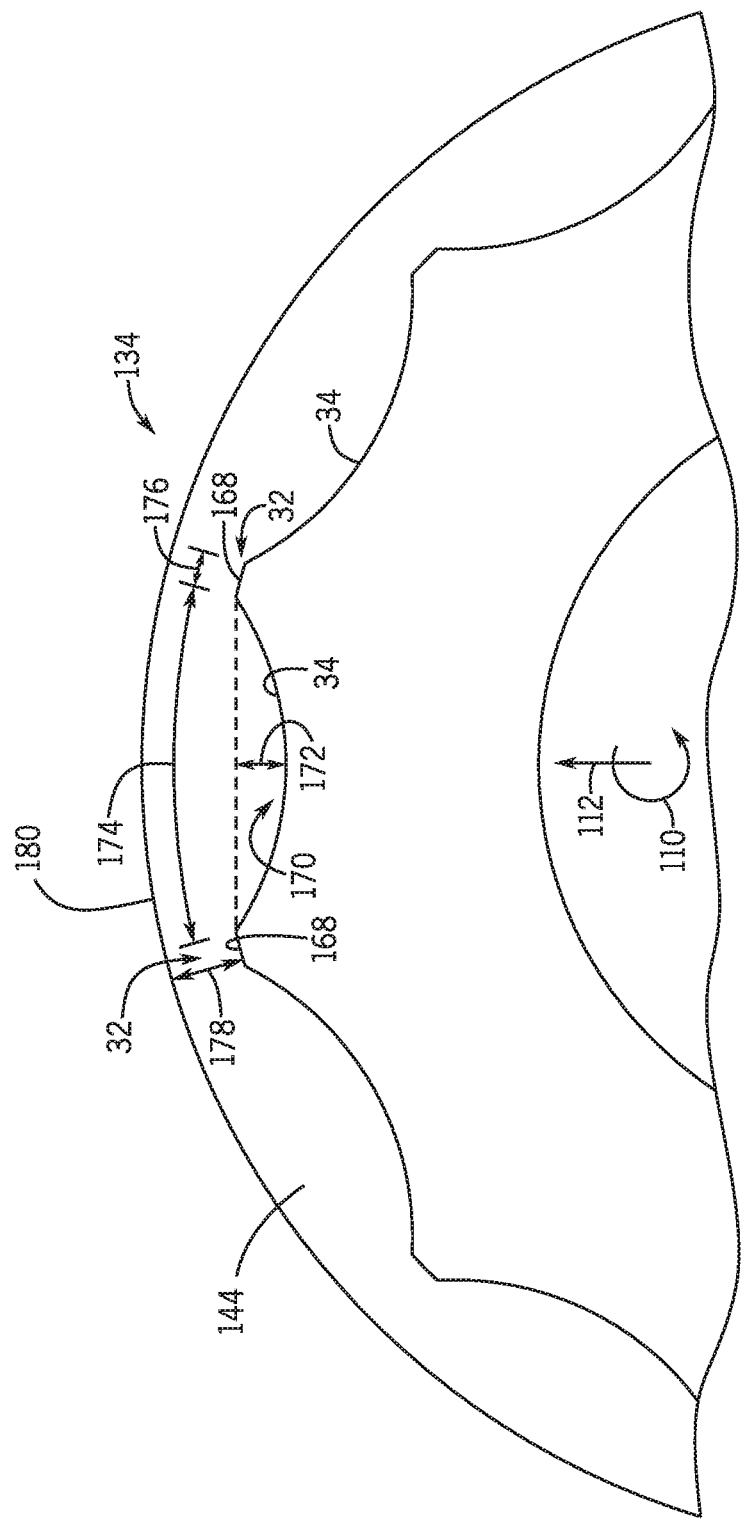
FIG. 14 is a detailed cross-sectional view of the meter roller of FIG. 11, taken within line 14-14 of FIG. 13.

FIG. 14 is a detailed cross-sectional view of the meter roller 134 of FIG. 11, taken within line 14-14 of FIG. 13. The aggregate volume of the recesses of the meter roller may be particularly configured to meter a particulate material having a coarse/large particle size, such as sunflower seeds. Accordingly, the volume of the recesses and the number of recesses may be particularly selected to achieve a target aggregate volume. For example, the target aggregate volume of the recesses of the meter roller may be between about 10,000 $mm^3$ and about 24,000 $mm^3$, about 14,000 $mm^3$ and about 20,000 $mm^3$, about 16,000 $mm^3$ and about 18,000 $mm^3$, about 17,400 $mm^3$ and about 17,600 $mm^3$, or about 17,523 $mm^3$. Utilizing such a meter roller profile may enable the motor of the drive unit to rotate the meter roller at a speed sufficient to facilitate precise control of the meter roller rotation rate (e.g., as compared to rotating a meter roller having a larger aggregate recess volume slower than a minimum controllable speed of the motor).

In the illustrated embodiment, the meter roller includes two segments, and each segment has 12 recesses. Accordingly, to achieve a target aggregate volume of about 17,523 $mm^3$, the volume 170 of each recess may be about 730.1 $mm^3$. However, to achieve a higher or lower target aggregate volume, the volume of each recess may be adjusted accordingly. In addition, if the meter roller includes more or fewer recesses, the volume of each recess may be adjusted to achieve the target aggregate volume.

In the illustrated embodiment, the longitudinal extent of each recess is about 15 mm. Accordingly, to achieve a recess volume 170 of about 730.1 $mm^3$, the cross-sectional area of each recess may be about 48.67 $mm^2$. However, it should be appreciated that if recesses having a larger or smaller longitudinal extent are utilized, the cross-sectional area of each recess may be adjusting accordingly. For example, the cross-sectional area of each recess may be between about 25 $mm^2$ and about 75 $mm^2$, about 30 $mm^2$ and about 70 $mm^2$, about 40 $mm^2$ and about 55 $mm^2$, or about 49 $mm^2$. In the illustrated embodiment, the target cross-sectional area of 48.67 $mm^2$ of each recess 34 is achieved by utilizing a depth 172 (e.g., extent of the recess along the radial axis 112) of about 3.9 mm and a circumferential extent 174 of about 18.5 mm. However, it should be appreciated that in certain embodiments, the depth of each recess may be between about 2 mm and about 6 mm, about 3 mm and about 5 mm, about 3.0 mm and about 4.5 mm, or about 3.9 mm. Furthermore, it should be appreciated that in certain embodiments, the circumferential extent of each recess may be between about 12 mm and about 25 mm, about 15 mm and about 23 mm, about 17 mm and about 20 mm, or about 18.5 mm.

In the illustrated embodiment, a circumferential extent 176 of each flute 32 (e.g., the circumferential extent of the outer circumferential surface of each flute) may be about 2 mm. However, it should be appreciated that in alternative embodiments, at least one flute may have a larger or smaller circumferential extent. For example, the circumferential extent of at least one flute (e.g., the circumferential extent of the outer circumferential surface of the flute) may be between about 0 and about 10 mm, about 2 and about 9 mm, about 2 and about 5 mm, or about 2 mm. In addition, a radial distance 178 between the outer circumferential surface 168 of each flute 32 and the periphery 180 of the shoulder 144 is about 4.1 mm. However, it should be appreciated that in certain embodiments, the radial distance 178 may be between about 0 mm and about 8 mm, about 2 mm and about 6 mm, about 3 mm and about 5 mm, or about 4.1 mm. By way of further example, the radial distance 178 between the outer circumferential surface 168 of each flute 32 and the periphery 180 of the shoulder 144 may be greater than 1 mm, 2 mm, 3 mm, 4 mm, or 5 mm.

The particular profile of the meter roller described with reference to FIGS. 11-14 may be particularly suited for metering particulate material having a coarse/large particle size (e.g., sunflower seeds) at a low application rate (e.g., about 0.65 to about 4.55 kg/acre), thereby enhancing the accuracy of the metering process. In addition, because the outer circumferential surface of each flute is positioned radially inward from the periphery of the shoulders, the meter roller segments may accommodate particles having asymmetrical, irregular, or elongated shapes. For example, a particle having an asymmetrical, irregular, or elongated shape may have a longer dimension and a shorter dimension. The radial spacing between the outer circumferential surface of the flute and the periphery of the shoulder positions the recess at a greater radial distance from the periphery (e.g., as compared to a configuration in which the outer circumferential surface of the flute is positioned at the periphery of the shoulder) while establishing the target volume (e.g., based in part on the depth of the recesses relative to the outer circumferential surface of the flutes). Accordingly, if a particle having an asymmetrical, irregular, or elongated shape is disposed within a recess and oriented such that the longer dimension of the particle extends along the radial axis, the possibility of the particle being blocked by contact with the housing (or another element of the cartridge or meter box) is substantially reduced or eliminated. As a result, the illustrated meter roller may facilitate metering particles having asymmetrical shapes, irregular shapes, elongated shapes, or a combination thereof.

While all of the recesses in the illustrated embodiment have substantially equal depths and circumferential extents, it should be appreciated that in alternative embodiments, the depth and/or circumferential extent of one recess may be different than the depth and/or circumferential extent of another recess. In addition, while all of the flutes in the illustrated embodiment have substantially equal circumferential extents, it should be appreciated that in alternative embodiments, the circumferential extent of one flute may be different than the circumferential extent of another flute. Furthermore, while the radial distances between the outer circumferential surfaces of the flutes and the periphery of the shoulder are substantially equal to one another in the illustrated embodiment, it should be appreciated that in alternative embodiments, one radial flute/periphery distance may be different than another radial flute/periphery distance.

While only certain features have been illustrated and described herein, many modifications and changes will occur to those skilled in the art. It is, therefore, to be understood that the appended claims are intended to cover all such modifications and changes as fall within the true spirit of the disclosure.

The invention claimed is:

1. A meter roller for an agricultural metering system, comprising:
a plurality of flutes and a corresponding plurality of recesses, wherein the plurality of flutes and the corresponding plurality of recesses are arranged on one or more segments in one or more respective alternating patterns along a circumferential axis of the meter roller, and the plurality of flutes and the corresponding plurality of recesses are configured to meter flowable particulate material from a storage tank to a material distribution system via rotation of the meter roller;
wherein each segment of the one or more segments comprises at least 12 flutes of the plurality of flutes, each segment of the one or more segments comprises at least 12 recesses of the corresponding plurality of recesses, and an aggregate volume of the corresponding plurality of recesses is between about 80,000 mm$^3$ and about 84,000 mm$^3$.

2. The meter roller of claim 1, wherein a depth of each recess of the corresponding plurality of recesses is between about 4.5 mm and about 5.5 mm.

3. The meter roller of claim 1, wherein a circumferential extent of each recess of the corresponding plurality of recesses is between about 20 mm and about 21 mm.

4. The meter roller of claim 1, wherein a circumferential extent of an outer circumferential surface of each flute of the plurality of flutes is about 2 mm.

5. The meter roller of claim 1, wherein each recess of the corresponding plurality of recesses has an arcuate concave cross-section.

6. The meter roller of claim 1, wherein a longitudinal extent of each segment of the one or more segments is between about 46 mm and about 49 mm.

7. The meter roller of claim 1, wherein a cross-sectional area of each recess of the corresponding plurality of recesses is between about 70 mm$^2$ and about 73 mm$^2$.

8. A meter roller for an agricultural metering system, comprising:
one or more segments each having a plurality of flutes and a corresponding plurality of recesses, wherein the plurality of flutes and the corresponding plurality of recesses of each segment of the one or more segments are arranged in an alternating pattern along a circumferential axis of the meter roller, and the plurality of flutes and the corresponding plurality of recesses of each segment of the one or more segments are configured to meter flowable particulate material from a storage tank to a material distribution system via rotation of the meter roller;
wherein each segment of the one or more segments comprises a first shoulder positioned on a first longitudinal side of the plurality of flutes and the corresponding plurality of recesses, and a second shoulder positioned on a second longitudinal side of the plurality of flutes and the corresponding plurality of recesses, opposite the first longitudinal side;
wherein the plurality of flutes of each segment of the one or more segments comprises at least 12 flutes, the corresponding plurality of recesses of each segment of the one or more segments comprises at least 12 recesses, and an aggregate volume of the one or more corresponding pluralities of recesses of the one or more segments is between about 17,400 mm$^3$ and about 17,600 mm$^3$.

9. The meter roller of claim 8, wherein a radial distance between an outer circumferential surface of each flute of the plurality of flutes of each segment of the one or more segments and a periphery of the first shoulder of the segment is greater than 4 mm.

10. The meter roller of claim 8, wherein a depth of each recess of the corresponding plurality of recesses of each segment of the one or more segments is between about 3.0 mm and about 4.5 mm.

11. The meter roller of claim 8, wherein a circumferential extent of each recess of the corresponding plurality of recesses of each segment of the one or more segments is between about 17 mm and about 20 mm.

12. The meter roller of claim 8, wherein a circumferential extent of an outer circumferential surface of each flute of the plurality of flutes of each segment of the one or more segments is about 2 mm.

13. The meter roller of claim 8, wherein each recess of the corresponding plurality of recesses of each segment of the one or more segments has an arcuate concave cross-section.

14. The meter roller of claim 8, wherein a longitudinal distance between the first shoulder and the second shoulder of each segment of the one or more segments is between about 10 mm and about 20 mm.

15. A meter roller for an agricultural metering system, comprising:
one or more segments each having a plurality of flutes and a corresponding plurality of recesses, wherein the plurality of flutes and the corresponding plurality of recesses of each segment of the one or more segments are arranged in an alternating pattern along a circumferential axis of the meter roller, and the plurality of flutes and the corresponding plurality of recesses of each segment of the one or more segments are configured to meter flowable particulate material from a storage tank to a material distribution system via rotation of the meter roller;
wherein each segment of the one or more segments comprises a first shoulder positioned on a first longitudinal side of the plurality of flutes and the corresponding plurality of recesses, and a second shoulder positioned on a second longitudinal side of the plurality of flutes and the corresponding plurality of recesses, opposite the first longitudinal side;
wherein a radial distance between an outer circumferential surface of each flute of the plurality of flutes of each segment of the one or more segments and a periphery of the first shoulder of the segment is greater than 4 mm, and an aggregate volume of the one or more corresponding pluralities of recesses of the one or more segments is between about 17,400 mm$^3$ and about 17,600 mm$^3$.

16. The meter roller of claim 15, wherein a depth of each recess of the corresponding plurality of recesses of each segment of the one or more segments is between about 3.0 mm and about 4.5 mm.

17. The meter roller of claim 15, wherein a circumferential extent of each recess of the corresponding plurality of recesses of each segment of the one or more segments is between about 17 mm and about 20 mm.

18. The meter roller of claim 15, wherein a circumferential extent of the outer circumferential surface of each flute of the plurality of flutes of each segment of the one or more segments is about 2 mm.

19. The meter roller of claim 15, wherein each recess of the corresponding plurality of recesses of each segment of the one or more segments has an arcuate concave cross-section.

20. The meter roller of claim 15, wherein a longitudinal distance between the first shoulder and the second shoulder of each segment of the one or more segments is between about 10 mm and about 20 mm.

\* \* \* \* \*